INVENTOR.
ALBERT ABRAMSON
BY Harry R. Lubcke
AGENT

*INVENTOR.*
ALBERT ABRAMSON
*BY* Harry R. Lubcke
AGENT

April 5, 1960 A. ABRAMSON 2,931,855

STEREOSCOPIC COLOR TELEVISION SYSTEM

Filed July 1, 1957 4 Sheets-Sheet 3

INVENTOR.
ALBERT ABRAMSON
BY Harry R. Lubcke
AGENT

STEREOSCOPIC COLOR TELEVISION SYSTEM

Filed July 1, 1957 4 Sheets-Sheet 4

INVENTOR.
ALBERT ABRAMSON
BY Harry R. Lubcke
AGENT

United States Patent Office 2,931,855

Patented Apr. 5, 1960

2,931,855

STEREOSCOPIC COLOR TELEVISION SYSTEM

Albert Abramson, Sun Valley, Calif.

Application July 1, 1957, Serial No. 669,169

15 Claims. (Cl. 178—5.2)

My invention relates to stereoscopic television in natural colors and more particularly to such a system in which certain circuit elements act in both the stereoscopic and the color processes.

Heretofore the accomplishment of stereoscopic color television has been nebulously treated by the art and has called for interminable complication. Viewers have often been called upon to wear spectacles of some sort or to view the screen through a mechanical view alternator. Certain systems have attempted to create stereoscopic views without any relation of the same to the scanning inherent in television. Other systems have used unconventional scanning patterns.

Briefly, I overcome shortcomings of the prior art by forming intercalated left and right eye stereoscopic images, these upon each of a plurality of interleaved photoelectric and light filter surfaces. From each photo electric surface a color television signal is formed which has the required stereoscopic aspects because of intercalation. Strict linearity of the television scanning transverse of the intercalations is achieved by scanning a conductive grid on the photoelectric surfaces.

The color aspects of my system preferably follow the subcarrier simultaneous system that is the present United States standard. Transverse scanning at the camera is conformed to the alternations of the subcarrier.

The received image is reproduced intercalated behind a transparent lenticulated surface so that the right and left eyes of the viewer see only the corresponding images intended for them. Coaction between the alternations of the color subcarrier and an indexing grid upon the phosphor screen of the cathode-ray reproducing device insures accuracy of transverse scanning. Primary color phosphor stripes are aligned with the lenticulations of the lenticulated surface. Each phosphor is treated to possess a unique secondary emission ratio. An electrode to collect the secondary emission and a circuit to compare that with the primary emission of the electron beam determines the ratio and accordingly gates open the control electrode of a single cathode-ray gun to the proper primary color video signal for accomplishing color reproduction.

An object of my invention is to provide a unified stereoscopic color television system.

Another object is to eliminate the need for viewing spectacles or similar aids in such a system.

Another object is to utilize certain instrumentalities of the system for both color and stereoscopic purposes.

Another object is to control color reproduction by a property unique to each primary color phosphor.

Another object is to provide a relatively simple stereoscopic color television system.

Another object is to produce stereoscopic simultaneous color signals in proper registry within a single camera tube.

Other objects of my invention will become apparent upon reading the following detailed specification and upon examining the accompanying drawings, in which.

Figure 1:
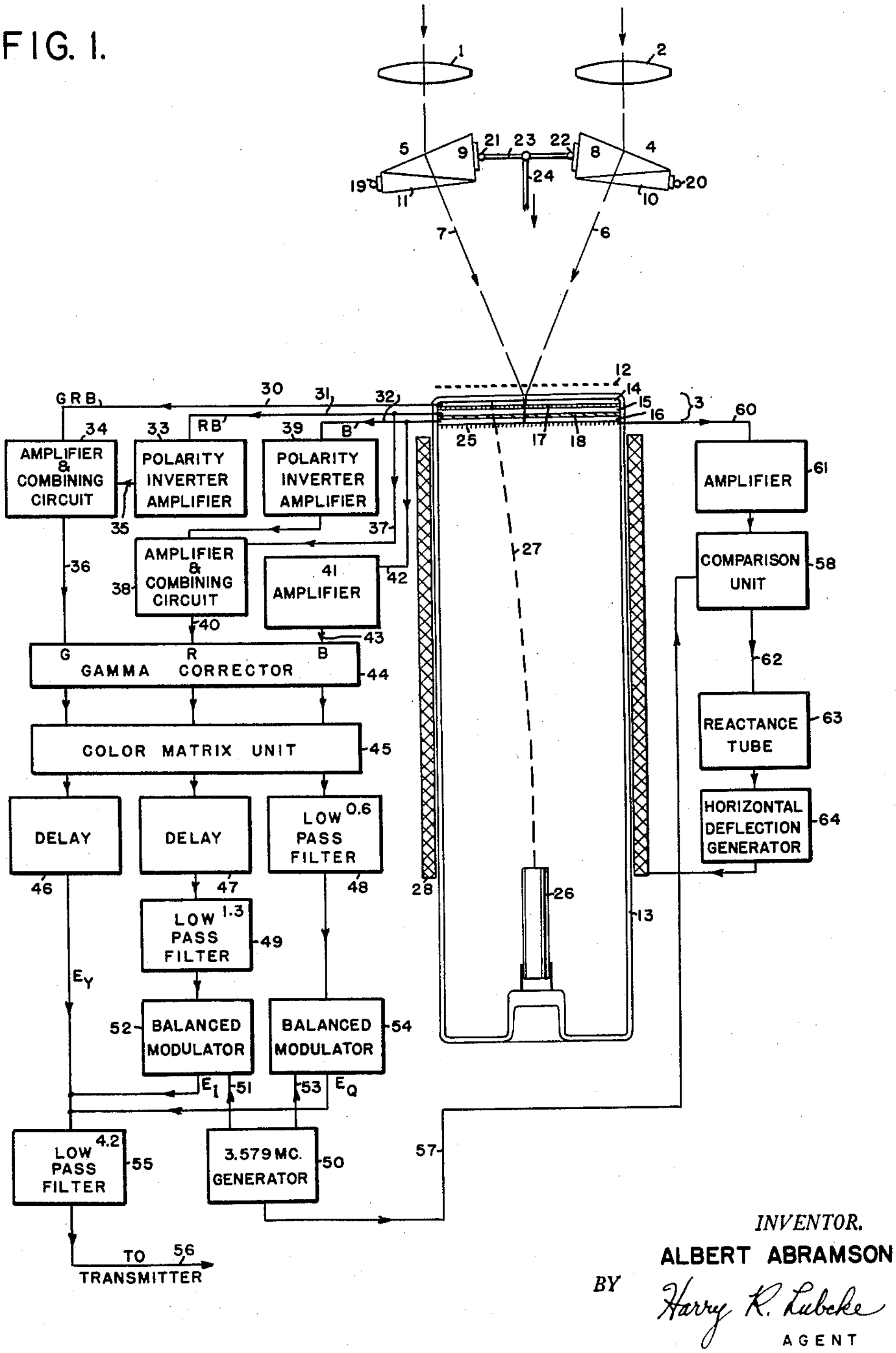
Fig. 1 shows a diagram, partly structural and partly block, of the camera.

In Fig. 1 numeral 1 indicates a left eye positive image-forming lens and 2 an identical right eye companion. The focal lengths and apertures of each are equal and such that left and right eye images of a field of view located beyond the figure, above the top of the sheet of paper of Fig. 1, are focused on the image-receiving surfaces generally denoted by 3. These structural features of Fig. 1 are in plan view. The center-line distance between lenses 1 and 2 is the usual interocular distance of approximately 2½ inches for normal viewing. Elements 4 and 5 are achromatic prisms employed to deviate the rays forming the left and right eye images to approximate superposition without introducing chromatic aberration. Central rays 6 and 7 are illustrative. Each prism has a major portion 8, 9 of crown glass and a minor portion 10, 11 of flint glass. Alternately opaque and transparent grating 12 is positioned in front of the image-receiving surfaces 3 so that any portion of these surfaces receives an image from either the left or the right eye lens, but not from both. The grating is vertically disposed in order that the system shall transmit images for the normally horizontal alignment of the viewer's eyes.

In passing from air to glass the representative rays are bent toward the normal to the end surface of camera tube 13. It will be noted that this occurs after the images have been separated at grating 12 and that this causes the path to be essentially prependicular to the several layers 3. The thickness of these layers has been exaggerated in Fig. 1 so that they may be separately shown. In a typical embodiment the surfaces are only of the order of a few thousandths of an inch thick.

Figure 3:
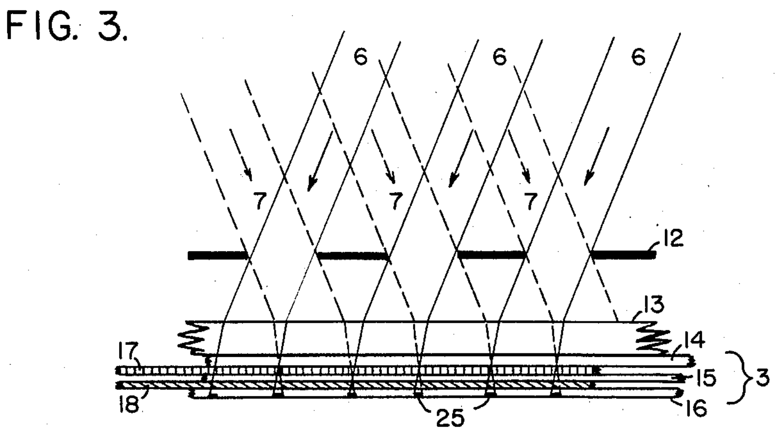
Fig. 3 shows a structural plan view of the camera optics at enlarged scale.

The optics of this aspect are shown somewhat more clearly in the greatly enlarged view of a portion thereof as shown in Fig. 3. It is seen how that the grating 12 separates the images designated by multiple rays 6 and 7. Actually, the whole of both left and right eye images are present in the plane of the grating, but only the parts identified as 6 and 7 pass beyond the grating and so form the intercalated or interpolated portions of left and right eye images. Because of the refraction at the glass surface 13 only one of these images penetrates the several image-receiving layers over any vertical strip thereof, as is shown.

Three light to electricity transducing surfaces 14, 15 and 16 are employed. These are thin, relatively transparent layers of photoconductive material such as used in the known vidicon camera tube. Layer 14 is coextensive with the full inner surface of the glass envelope 13. It must be transparent to light but need not pass an electron beam. This light sensitive surface is normally orthochromatic, but particularly must be green sensitive, The green primary color signal is derived therefrom. Below surface 14 is a thin magenta filter 17, which separates and insulates surfaces 14 from surface 15. This allows the red and blue components to pass and so to impinge upon the second light sensitive surface 15. This surface should have approximately the same orthochromatic sensitivity as surface 14, and must include red, since it it used to derive the red signal. Both the magenta filter and surface 15 are electron permeable as well as transparent to light so that the first mentioned surface may be scanned by an electron beam.

Beneath the second sensitive layer is a thin cyan filter 18. This filter separates and insulates surface 15 from surface 16. It passes only the blue color component. Below this is the third light sensitive surface 16. It is desirable for this surface to have the same orthochromaticity as the other two light sensitive surfaces even though it supplies only the blue signal directly. Indirectly this signal is used to derive another primary color signal by algebraic addition and so should contain the electrical values based upon a common chromaticity curve. Surface 16 need not be transparent to light but it must have the highest electron beam permeability.

First surface 14 is called upon to provide full image detail for the subsequent color portion of the television system. The other two surfaces, 15 and 16, are called upon to provide color information only with an allowable loss of detail. Thus, surface 15 is called upon to provide the red component with 50% to 75% of full image detail Surface 16 is called upon to provide the blue component with 25% to 50% of full image detail. For this reason the lower surface 16 has the photo-sensitive material deposited upon a relatively loose mesh screen which passes the electron beam without deleterious loss of energy. The middle surface 15 has the photo-sensitive material deposited upon a finer mesh screen which passes both the light from the screen structure to the lower surface and the electron beam from the opposite direction without deleterious loss of energy. The color filters are formed of an electron and light transparent substance such as cellophane or another plastic. Electron beam 27 sweeps all three light sensitive surfaces simultaneously and thus produces three simultaneous color video signals.

It is desirable that the left and right eye optical systems converge, or toe-in, when the object of principal interest is close to the camera. This I accomplish by providing an over-riding linkage connected to the lens focusing control of the camera, which linkage alters the orientation of prisms 4 and 5. These prisms are pivoted about vertical hinges 19 and 20 fastened to the outer ends of the prisms. Similar hinges 21 and 22 are attached to the inner ends of the prisms and are in turn attached to tie arm 23. Rod 24 attaches to the center of arm 23 and to a crank attached to the lens focusing system. Since the latter is the known mechanism for altering the distance between lenses 1 and 2 as a unit and the sensitive surfaces 3 it has not been shown. Convergence is required only for objects closer than approximately ten feet from the camera, thus the slip linkage connection to the focusing mechanism does not operate until the lens focusing adjustment reaches that position. In usual camera construction the camera tube 13 is usually moved to focus and is moved backward away from the lenses to focus close objects. Rod 24 must also move backward for close objects. The angular convergence is only a few degrees, thus the mechanical motion of rod 24 is at a reduced ratio from the translation of the lens system. This is attained by a short lever arm on the system for the convergence motion.

In addition to the surface elements previously described in connection with Fig. 3, camera tube 13 also has a conductive grid 25 deposited upon the rear sensitive surface. The grid conductors are aligned with the optical grating 12 and have a conductor for each edge of the grating. An electron gun of the known vidicon type is also provided at the rear of the camera tube. The gun produces electron beam 27 upon being energized by potentials in the known manner, which beam is focused and deflected by yoke 28, shown in section in Fig. 1.

Necessary primary color signals are derived from the sensitive surfaces previously described in the following manner. An external connection 30 to forward surface 14 has a video signal flowing therein as the result of television scanning by beam 27 corresponding to white light, that is, including each of the green-red-blue primaries. Similarly, because of the magenta filter, wire 31 connected to surface 15 has a red-blue video signal. Wire 32, connected to surface 16, has only a blue signal because of the additional presence of the cyan filter.

Block element 33 represents a plural stage video amplifier of known construction having an odd number of stages so that the polarity of the output is opposite to that of the input. The chromatic value of the video signal output at 35 is thus negative red-blue. Block 34 represents an approximately similar amplifier to the one previously described, save that an even number of stages are employed and the polarity of the output is not reversed. The chromatic value of this video signal is thus positive green-red-blue. The video output of 33 is fed to 34 by wire 35 and the two video outputs combined in 34 by the known arrangement of connecting the plate circuits of the two final vacuum tubes of amplifiers 33 and 34. By so doing algebraic addition is accomplished; positive green-red-blue and negative red-blue equals green. Thus, a video signal of essentially full image detail and having a positive green chroma flows in wire 36.

In an analogous manner, wire 37 conveys a positive red-blue video signal to amplifier and combining circuit 38. Block 39 acts upon a positive blue signal in the same manner as block 33 acted on an input signal; i.e., it is amplified and phase-reversed, becoming a negative blue video signal. Block 38 thus having positive red-blue and negative blue inputs, the output is positive red chroma. This flows out via wire 40.

Finally, a positive blue video signal from connection 32 is conveyed to amplifier 41 via wire 42. This is merely amplified to essential equality of amplitude with respect to the other video signal outputs and as a positive blue output flows out via wire 43.

Green, red and blue video signals have thus been formed from the outputs of the camera tube sensitive surfaces. These signals then enter simultaneous subcarrier type color television circuitry that is known and thus is described below in only general terms.

Gamma corrector 44 compensates for the exponential-like non-linearity of the cathode-ray image reproducer by introducing an inverse amplitude function in each of the green, red and blue video signals. Color matrix unit 45 accepts these signals and by intercombination thereof forms a brightness or luminance signal $E_Y$ and two chrominance signals $E_I$ and $E_Q$. The brightness signal is wide band, to the order of 5 megacycles, and thus must be delayed in order to reach subsequent portions of the circuit at the same time as the 0.6 megacycle wide $E_Q$ signal. This delay is provided by delay line 46, a known element. A similar but shorter delay element 47 sufficiently delays the 1.3 megacycle wide $E_I$ signal. In order that the bandwidth of the $E_Q$ signal be suitably restricted it is passed through low pass filter 48 having a 0.6 mc. cutoff frequency, and correspondingly for the $E_I$ signal filter having a 1.3 mc. cutoff frequency.

The 3.579545 megacycle sine waveform subcarrier generator 50 is well known in this color television system. Two identical outputs therefrom, save for a phase difference of ninety degrees, are conveyed via wire 51 to the $E_I$ balanced modulator 52 and via wire 53 to the $E_Q$ balanced modulator 54. Thus modulated upon the subcarrier the two outputs are combined with the $E_Y$ signal and passed through over-all low pass filter 55 having a cutoff frequency of 4.2 mc. From here the video signal is the color television signal now standardized by the Federal Communications Commission for the United States, save that the image inherent therein is the intercalated stereoscopic composite rather than merely a single view. This signal passes through conductor 56 to a radio frequency transmitter, a coaxial cable line or any other means for conveying the image signal to a reproducer as may be desired.

For further details concerning the color circuitry per se the reader is referred to a standard textbook on color television or to the paper by J. Barstow, appearing in the "Journal of the Society of Motion Picture and Television Engineers," vol. 65, No. 2, pp. 73–79, February 1956.

In stereoscopic color television it is important that the geometrical consequences of the horizontal television scanning processes be congruent or strictly similar at the camera and reproducer devices. Only then will the necessary optical accuracy of the intercalated left and right eye images be obtained. I attain this end by standardizing the scans at the camera and the reproducer to the alternations of the color subcarrier generator.

Figure 5:
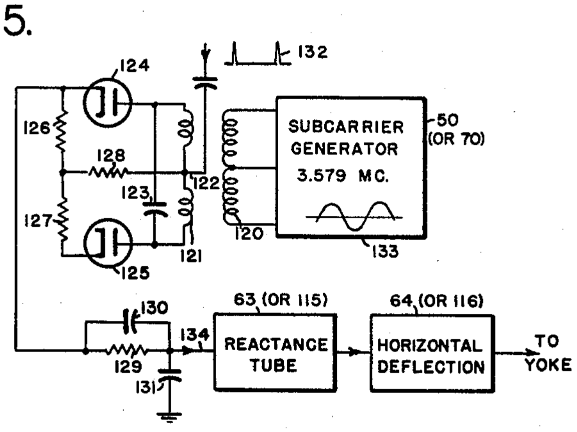
Fig. 5 shows a schematic diagram for a scanning index comparator.

Consequently, an output from generator 50 in Fig. 1 is conveyed via wire 57 to a comparison unit 58. An output of relatively sharp pulses is obtained from the electron beam scanning of conductive grid 25 via wire 60. This output is amplified to an amplitude comparable to that from the subcarrier generator by amplifier 61. As will be further detailed in connection with the description of Fig. 5, comparison unit 58 combines the subcarrier and conductive grid waveforms in a manner that provides no output if these are in phase, but provides a positive D.C. output if the waveforms are out of phase in one direction and a negative output if out of phase in the other direction. This output is available at wire 62 and is used to influence the speed of horizontal scanning. In this way the speed of scanning is regulated and synchronized with the alternations of the 3.58 mc. subcarrier generator.

I prefer that a reactance tube 63 be affected by the compared waveform output and that this tube in turn affect the scanning speed of horizontal deflection generator 64. The latter may be of the known form utilizing a sine wave oscillator and subsequent wave-shaping circuits to provide an amplified sawtooth deflection output to the horizontal deflection windings of deflection yoke 28. Because the actual position of the electron spot is compared with the 3.58 mc. alternations any nonlinearity of the yoke and deflection system is eliminated from the scanning.

It will be understood that the number of opaque elements in grating 12 and lenticules 92 for accomplishing the stereoscopic process is fixed by the quotient of 15,750 into 3,579,545. This is 227. The former figure is the frequency of the horizontal scanning and the second figure the exact subcarrier frequency. Because approximately 14% of the horizontal scanning time is necessarily blanked out in television to allow for retrace of the scanning beam, 194 opaque elements for grating 12 in front of the camera tube and 194 lenticules on the front face of the reproducer are employed. This gives 97 left eye images and 97 right eye images. Correspondingly, there are 194 active conductors to the internal grids 25 and 111.

Should twice these numbers be desired for increased stereoscopic definition an alternate embodiment is possible in which twice 194 is the number for opaque elements and lenticules and a frequency doubler is employed between the 3.579 mc. generators 50 and 70 and the comparison circuits 58 and 114.

In this way I produce a stereoscopic color television signal. Synchronizing and blanking pulses are added to the outgoing signal in the usual manner.

Figure 2:
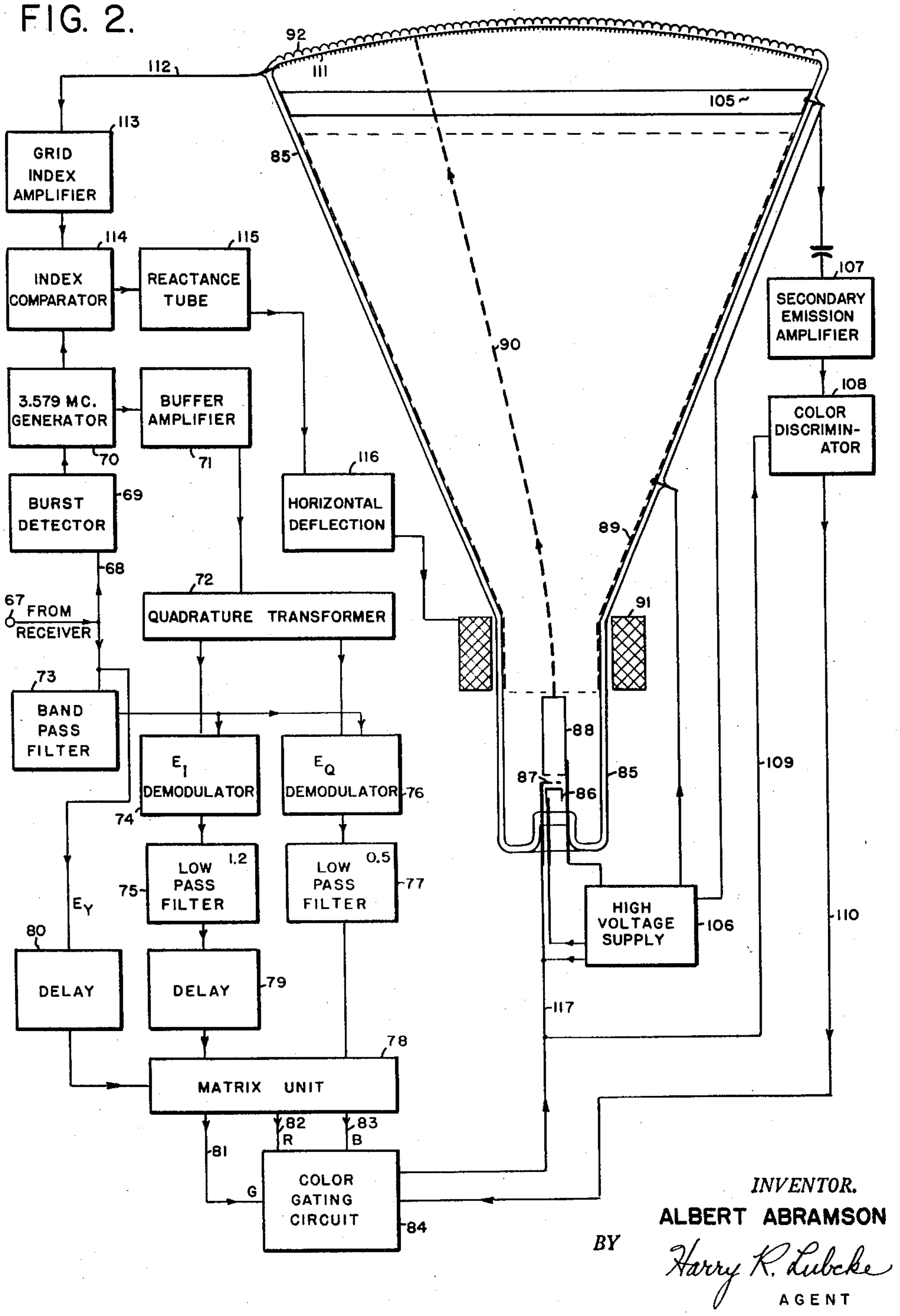
Fig. 2 shows a similar diagram of the reproducer.

For reproducing the stereoscopic color television images the previously mentioned signal is conveyed to the reproducing apparatus of Fig. 2. This is accomplished by a mere length of coaxial cable, the conventional television transmitter and receiver combination, or by equivalent means. Assuming the use of the transmitter-receiver link the latter demodulates the radio frequency wave to recover the video signal, has means for the usual television synchronization of the receiver scanning sources and delivers the video signal to terminal 67 in Fig. 2.

This signal is employed in two ways, the first via wire 68 to burst detector 69, where the known burst of 3.58 mc. energy employed for synchronizing the color process is removed from the video signal and applied to synchronize the local 3.58 mc. generator 70 once each horizontal line of the image. The alternations of this subcarrier are employed for both the color and the stereoscopic process.

Considering the color process first, the subcarrier energy passes through buffer amplifier 71 for isolation purposes and then to quadrature transformer 72 where two outputs at ninety electrical degrees are formed for demodulating the thus previously modulated chrominance signals. These signals come from band pass filter 73, which in turn is connected to incoming signal terminal 67. At $E_I$ demodulator 74 this signal is recovered, and through low pass filter 75 the maximum video frequency is restricted to 1.2 megacycles. Similarly, at $E_Q$ demodulator 76 the $E_Q$ signal is recovered and through low pass filter 77 the maximum video frequency is limited to 0.5 megacycle. The latter signal passes directly to matrix unit 78. The $E_I$ signal is given a nominal delay through delay unit 79 and thence to the matrix unit 78. The luminance signal $E_Y$ passes directly from the receiver output terminal 67 to a longer delay in delay unit 80 and thence to the matrix unit 78.

The luminance signal is added to the chrominance signals to form the video primaries. From the three inputs thus supplied, video signals corresponding to the color primaries green, red and blue are provided at wires 81, 82 and 83. The latter go to the color gating circuit 84, to be later described.

The reproducer proper is cathode-ray tube 85, shown in Fig. 2 in horizontal section, or equivalent electricity to light transducing means. The cathode-ray device has at least a triode electron gun composed of cathode 86, grid 87, and anode 88, as well as second anode 89, the latter deposited on the inner surface of the glass envelope. Electron stream 90 is produced by the gun and deflected for television scanning by yoke 91.

The front surface of the cathode-ray tube is ridged with many vertically disposed lenticules 92. These are equal in number to the vertical bars in grating 12 situated in front of the camera tube in Fig. 1. The lenticulated screen is shown in greater detail in Fig. 4. This figure is also a plan view. The glass envelope 85 has the lenticules 92 on the forward exterior surface and a series of vertical phosphor stripes and grid index conductors on the interior surface. The latter are in regularly recurring order; such as green, red, blue, green, red, blue and then a grid index conductor, these being identified by numerals 93, 94, 95, 96, 97, 98 and 99, respectively, in Fig. 4.

The series of inclined dotted lines 100 indicate the rays of illumination that reach the right eye of an observer. The curvature of the lenticulations 92, the thickness of the glass 85 and the index of refraction thereof are arranged so that the right eye sees only the right hand group of phosphor stripes 101. Similarly, the rays that reach the left eye, full lines 102, originate from the left hand group of phosphor stripes 103. The optics of each lenticule provides that the plane of the phosphor stripes be approximately the focal plane for normal viewing. It is not necessary that the groups of three adjacent different color stripes be resolved, since this comprises one complete color presentation that is to be integrated to a single color for the image in the eye of the viewer. It is necessary that the one group of three stripes be resolved with respect to the next group of three, since each group conveys geometrical image detail.

The selective viewing action occurs behind each lenticule, of course. In this way any observer can see only separated left and right eye intercalated images with his left and right eyes and so he sees the original scene in stereoscopic relief. Viewing the screen at the normal distance for television be cannot see the individual phosphor stripes nor the separate intercalated stereoscopic images. Since the sequence of phosphor stripes is twice repeated in the one lenticule view for one eye, two completely colored elements of the television image are presented to both the left and the right eye from each lenticule.

Suitable phosphors for the three kinds of stripes are obtainable, among which for green, zinc silicate with manganese activator and rhombohedrally crystallized may be used; for red, zinc-beryllium silicate similarly activated and crystallized; and for blue, zinc sulphide with silver activator and hexagonally crystallized.

In my system each of the phosphor stripes is required to give off secondary electrons according to a considerably different ratio, one with respect to another. This can be achieved by a suitable choice and preparation of phosphors, but I prefer to admix suitable substances with usual phosphors of roughly equal secondary emission ratios. The green phosphor is applied to the interior of the cathode-ray tube screen without modification and has the lowest secondary emission ratio of the completed screen, a value fractionally greater than one. The red phosphor is mixed with an appreciable amount of sodium chloride, the secondary emission ratio of the latter being six, so that the red stripes as a whole have a secondary emission ratio of something less than six, of the order of four. Similarly, the blue phosphor is mixed with a considerable amount of barium oxide-strontium oxide, such as used for vacuum tube cathodes, the secondary emission ratio of the latter being eleven, so that the blue stripes have a secondary emission ratio as an entity of the order of nine.

As the electron stream 90 sweeps across the phosphor stripes it will be seen that considerably different numbers of electrons will be given off from the screen for each electron incident thereon according to which kind of stripe is impinged. An insulated conductive band 105 is provided within the cathode-ray envelope near the phosphor screen. This is held at a slightly higher positive potential by high voltage supply 106 than that of any other electrode in the tube. Second anode 89 is held at the next lower potential, anode 88 at considerably lower, grid 87 at the plate potential of the vacuum tubes in the color gating circuit to allow direct coupling and cathode 86 at a more positive potential than that of grid 87 to arrange a negative bias thereon.

Electrode 105 thus collects substantially all the secondary emission from each phosphor strip as the electron stream passes over it. This relatively rapid variation with time from one datum to another produces a stepped waveform. This is amplified to an amplitude of a number of volts by secondary emission amplifier 107 and thence impressed upon color discriminator 108. Also impressed thereon is the video voltage of grid 87 of the cathode-ray tube. This is impressed via wire 109 in an opposing manner to the secondary emission waveform so that the ratio between primary and secondary electrons for each strip is obtained. This, of course, is independent of the absolute number of electrons involved in painting the light and dark areas of the color image. The ratio output is conveyed to the color gating circuit 84 for the actuation thereof via wire 110. The details of these circuits will be later described.

In the same way that a conductive grid 25 was formed upon the photosensitive surface in the camera an equivalent grid 111 is formed adjacent to the phosphor stripes in groups of six on the inner surface of the cathode-ray tube. The latter grid is shown in both Figs. 2 and 4. In Fig. 2 all of the vertically disposed conductors are connected together and by wire 112 to grid index amplifier 113. As electron stream 90 passes over each of these conductors a pulse-like signal is originated. Amplifier 113 raises the level thereof to a number of volts for comparison with an output from 3.579 mc. generator 70 in index comparator 114. A positive, negative or zero output of substantially direct current is obtained from this unit by phase comparison in the same manner as this was accomplished in comparison unit 58 in Fig. 1. Also as before, this output passes to a reactance tube, 115, and this controls the instantaneous scanning speed of horizontal deflection unit 116. Ordinary synchronizing pulses synchronize each line of this unit. The comparison control insures that the linearity within each line shall be maintained in order to present accurately formed intercalated stereoscopic images. The output of unit 116 goes to the horizontal deflection coils of yoke 91.

Fig. 5 shows the scanning index comparator labelled 58 in Fig. 1 and 114 in Fig. 2. These portions of both circuits are essentially the same, though may differ in values of the components to properly coact with the camera tube on the one hand and the cathode-ray tube on the other.

In any event, the subcarrier generator 3.579 mc. sine wave output (50 or 70) provides an output to winding 120 of a transformer adapted to handle frequencies in this magacycle region, such as a transformer having an air core or one of ferrite or high grade powdered iron. A second winding 121 is center-tapped and to that centertap the pulse waveform from the conductive grids 25 or 111 as amplified by amplifiers 61 or 113 is applied. Capacitor 123 tunes winding 121 to a frequency somewhat below the 3.579 mc. subcarrier. Diodes 124 and 125 are normally of the vacuum tube variety. The anodes of each connect to the above-described resonant circuit. The cathodes are connected through equal resistors 126, 127 of the order of a quarter megohm and single resistor 128 of the order of a half megohm to centertap 122.

An output is taken from the cathode of diode 124 and to a smoothing filter comprised of resistor 129 of one-quarter megohm, capacitor 130 of 0.0005 microfarad and capacitor 131 of 0.01 microfarad.

When the pulse wave form 132 is phased with respect to the sine wave waveform 133 to occur at the crossing of the zero axis of the latter the output at wire 134 is integrated to zero. If, however, the pulse occurs too soon in time with respect to the sine wave waveform the output integrates to a positive (D.C.) potential and if too late in time to a negative potential. This controls reactance tube 63 or 115 and so accurately adjusts the speed of horizontal deflection units 64 or 116 throughout each line of horizontal television scanning. Special control of the vertical television scanning is not required.

Figure 6:
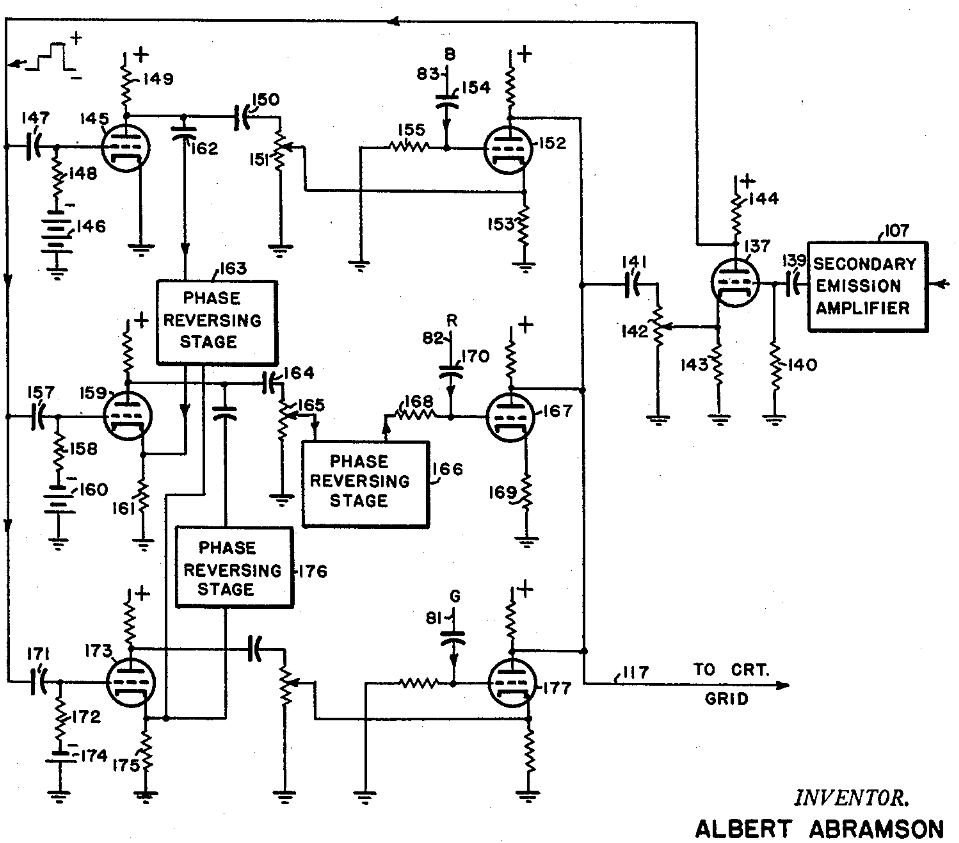
Fig. 6 shows a schematic diagram for a color discriminator and color gating circuit.

Fig. 6 shows the circuit for the color gate 84 at the reproducer (Fig. 2) at the left and for the color discriminator 108 at the right.

The grid of the color discriminator vacuum tube 137 (right) is connected to secondary emission amplifier 107 through coupling capacitor 139 and grid return resistor 140. The grid potential is thus proportional to the number of secondary electrons collected by electrode 105 (Fig. 2) at any instant of time. From wire 117, which connects to the grid 87 of the cathode-ray tube gun, a potential proportional to the number of primary electrons emitted by the gun at the same instant of time is impressed upon the cathode of vacuum tube 137. This latter potential is conveyed via coupling capacitor 141 and adjusted in amplitude by potentiometer 142, the latter being included so that this portion of the circuit may be adjusted for convenient operation. Resistor 143 connects the cathode of tube 137 to ground and resistor 144 the plate to the usual source of direct positive plate potential (not shown). The values of the several components are those for the usual video amplifier intended to handle a maximum frequency of the order of 4 megacycles, such values being known to the art. Series peaking inductors, etc., may be employed in the plate circuits, if desired.

In vacuum tube 137 the plate current depends upon the relative potentials of the grid and of the cathode, since all other factors are held constant. As connected, the grid potential corresponds to the secondary emission of a particular phosphor stripe at a particular instant and the cathode potential to the primary emission incident upon the same phosphor stripe at that instant. Thus, the plate current will be proportional to the ratio of the two, which is the secondary emission ratio of the stripe according to usual terminology. Since I have provided a unique secondary emission ratio for each kind of phosphor stripe the output of tube 137 indicates whether the electron stream 90 is scanning a green stripe, a red stripe or a blue stripe. A stepped waveform of three steps is produced, repeated over and over as the stream scans the phosphor screen.

This waveform is taken as a voltage from the plate of tube 137 and impressed upon all of the input circuits of color gate 84. The color gate circuit is at the left in Fig. 6.

Vacuum tube 145 is adapted to pass the blue video signal because it has been arranged to respond to the maximum range of potential and the blue phosphor stripes have been compounded to have the maximum secondary emission ratio. Negative fixed grid bias source 146 provides a bias sufficiently great to cut off tube 145 on the two lower potential steps of the waveform output from tube 137 and only to allow the maximum potential to cause plate current flow in tube 145. The cathode of the same is connected directly to ground. The number of stages in secondary emission amplifier 107 is such as to give the maximum negative potential to the grid of tube 137, thus the maximum positive voltage output; the latter always being the inverse of the plate current in a resistor-capacitor amplifier stage.

Capacitor 147 and resistor 148 have usual grid input circuit values for a video amplifier as previously mentioned. Plate resistor 149 connects to the plate of tube 145 and also to a source of plate operating potential indicated by the "plus" sign but not otherwise shown. An alternating signal corresponding to the peaks only of the stepped waveform thus flows and as a voltage at the plate of tube 145 passes through coupling capacitor 150, through signal-level-adjusting potentiometer 151 and to the cathode of vacuum tube 152. This tube has cathode resistor 153 of sufficiently large value to bias the tube to cut off in the absence of a signal from potentiometer 151. This signal is of negative polarity because of the plate current flow in tube 145 when the bias is exceeded. The cathode of tube 152 becomes more negative and this is the same as the grid thereof becoming more positive; i.e., the tube is no longer cut off.

Through capacitor 154 and over grid return resistor 155 the blue video signal from the matrix unit of Fig. 2 is conveyed via wire 83, reaching the grid of tube 152. For the period of time that the blue phosphor stripe is being scanned the blue video signal is passed by tube 152. The video variation thereof is passed on to the grid of the cathode-ray tube 87 via wire 117 and the more or less elemental portion of one blue stereoscopic image is formed on the phosphor screen.

It will be recognized that as an alternate connection, a simple phase reversing stage may be included after potentiometer 151 and the gating pulse, now positive in voltage, may be applied to the left hand end or electrical bottom of grid leak 155. This arrangement also opens tube 152 to the blue video signal.

In either event, the amplitude of the gating pulse is adjusted by potentiometer 151 to place the operating point of tube 152 on the linear portion of the tube characteristic.

The second row of circuit elements in Fig. 6 are similar to the first, save that these are operative on the intermediate ratio of secondary emission from the screen. This is accomplished as follows.

The gating signal is conveyed through coupling capacitor 157 and over grid return resistor 158 to the grid of tube 159. However, the value of the fixed negative bias source 160 is smaller than was source 146 and the cathode of tube 159 has a self-bias resistor 161 of a nominal value rather than being connected directly to ground. The fixed bias is such as to cut off the tube for the low value of the gating waveform but to pass a pulse upon the intermediate value. As has been explained, upon the high value of that waveform tube 145 conducts, lowering the signal plate voltage thereof correspondingly. Through capacitor 162 connected to that plate the negative voltage pulse is conveyed to a simple single stage phase-reversing amplifier 163, the output of which is a positive pulse. Thus obtained, this pulse is applied to the cathode of tube 159 over resistor 161. This is of sufficient amplitude to cut off tube 159 by virtue of the cathode becoming too positive for plate current conduction.

A gating pulse thus being passed only during the intermediate value of the incoming stepped wave this passes through coupling capacitor 164 and through potentiometer 165 as before. It next enters a simple one stage phase-reversing amplifier 166, thereby becoming a positive voltage pulse and therefore suitable for opening tube 167 when applied as a change in bias to grid return resistor 168. Cathode resistor 169 has a proper value for linear operation of tube 167. The red video signal is conveyed by wire 82 and through coupling capacitor 170 in the same manner as the blue signal was before. Similarly also, the red video signal is passed on to wire 117 during the time when a red phosphor stripe is being scanned. It will be noted that phase-reversing stage 166 is the one previously mentioned as an alternate in describing the blue gating channel. In any practical embodiment it is usual to make all three gating portions of the circuit the same, but for purposes of illustration the modification has been included in the red gating portion.

The third row of circuit elements in Fig. 6 is generally similar to the two rows above. The gating signal is conveyed through coupling capacitor 171 and over grid return resistor 172 to the grid of tube 173. The value of fixed negative bias source 174 is still smaller than that of source 160 and the cathode of tube 173 has a still larger resistor 175 than prior resistor 161.

The bias provided by fixed source 174 and the self-bias afforded by cathode resistor 175 are such that tube 173 conducts upon the lowest step of the stepped gating waveform. When the second step of greater amplitude occurs the output from phase-reversing stage 176 increases the bias on the cathode of tube 173 so that it no longer conducts. Thus tube 173 is cut off as required. When the third step of greatest amplitude occurs tube 159 is also cut off, thus bias output from tube 145 is required to maintain tube 173 in the cut off condition. This is obtained from a second output from phase-reversing stage 163, as from separate plates in a double triode vacuum tube with the grids and the cathodes connected together.

The remainder of the lower row of circuit elements is the same as that for the first row, save that a green video signal from wire 81 is gated rather than the blue. The output from tube 177 passes to wire 117 when a green phosphor stripe is being scanned.

The above completes the description of one embodiment of my invention. Certain alternate embodiments are possible.

In Fig. 1 convergence of the optical system for closein subjects can be attained by translating the two lenses laterally toward each other rather than by altering the angular relation of the prisms. This may be mechanically attained by providing slides for the lens boards, with a rack and coacting pinions to accomplish the two motions from one control. This control may be connected to the focusing mecheanism as has been previously described.

Rather than the photoconductive vidicon type of sensitive surfaces 14, 15 and 16 previously described, these may instead be photoemissive such as employed with the iconoscope or orthicon (not the image-orthicon). The requirement in this regard is that the signal employed for video purposes must arise from a connection to the particular surface involved, i.e., a signal plate, not from electrons that have departed therefrom.

As to the surfaces per se, surfaces 15 and 16 were specified as formed by depositing the sensitive material on wire meshes. These may also be formed by laying down sensitive surfaces having a large number of uniformly distributed voids or spaces between the portions of the material. The proportion of voids to material is the same as the proportion previously described for the wire meshes. The voids need be small in relation to the diameter of the electron beam 27 so that a portion of the cross-section of the beam is available to pass on to the forward layers at each position that the beam assumes.

Figure 4:
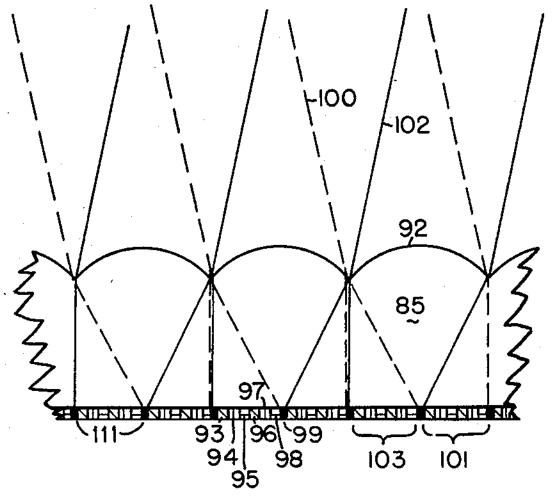
Fig. 4 shows a structural plan view of the reproducer optics at a still greater enlarged scale.

In Fig. 4 six vertical color stripes per lenticule were shown. For finer interposition of the left and right eye stereo images this may be reduced to three. For coarser interposition it may be any reasonable finite number, preferably in multiples of three, of which thirty might be considered a practical maximum.

Although the secondary emission substances previously specified for inclusion in some phosphor stripes give a desirable spread in secondary emission ratios, other substances are useable. These include barium fluoride, having a secondary emission ratio of 4.5 and suitable for relatively large inclusion in the blue phosphor, and beryllium oxide, having a ratio of 3.4 and suitable for lesser inclusion in the red phosphor. Greater and lesser amounts of one secondary emission substance may also be used in these two stripes to give the required difference in secondary emission ratio.

It is desirable that the detail potentialities of the green phosphor not be impaired. However, this will not occur with small inclusions of secondary material should it be desired to raise the ratio of this phosphor, or to exchange the position thereof with one of the others in the ratio sequence.

It is possible, of course, to carry out my system of stereoscopic television without color. For such only one sensitive layer 14 is required in the camera tube and the image-orthicon type of tube may be used as well as the others previously mentioned. The conductive grid 25 is still required. The viewing screen has only a white-light-producing phosphor, but indexing grid and the lenticules are retained.

Whether in color or black and white the relation between the lenticules and the left and right eye images must be such as to direct the proper intercalated image to the correct eye. If this does not occur the stereoscopic effect will not be realistic. The condition is removed by adjusting the horizontal position control for the image raster to move the same as a whole a distance of half a lenticule width.

In the figures herein certain established practices have been followed, such as omitting the heater elements and circuits therefor from vacuum tubes, indicating a battery where an A.C. to D.C. electrical power supply may be employed and using the plus sign to indicate a plate voltage supply. Circuit modifications of the color system per se are also possible. While vacuum tubes have been indicated in the circuits equivalent transistorized circuits may also be employed, particularly for the several amplifiers. Magnetic rather than electrostatic focusing may be employed in the cathode-ray tube and metal cone envelope construction may also be employed for the latter as long as an insulated collector 105 is provided.

Other modifications may be made in the arrangement, size, proportions and shapes of the elements of my system and in the characteristics of the circuit elements, details of circuit connections and limited alteration of the coactive relation between the elements without departing from the scope of my invention.

Having thus fully described my invention and the manner in which it is to be practiced, I claim:

1. A color stereoscopic television system comprising means for forming right and left eye images of a field of view upon a plural layered image surface of alternately color filters and image-sensitive material, means to produce color video signals corresponding to said images, subcarrier means for transmitting said video signals having a modulator connected to said means-to-produce-color-video-signals for impressing said video signals upon said subcarrier, means to maintain the production of said video signals in synchronism with said subcarrier; means for reproducing right and left eye images of said field of view, means to restrict the view of the right eye of a viewer to see only the right eye image and the left eye only the left eye image, said means for reproducing having different color-producing elements in each said image, each said different element having a unique ratio of secondary emission, means to sense the secondary emission ratio in the operation of said means for reproducing, means connected to said means to sense the secondary emission ratio to ascertain which color video signal shall control said means for reproducing to accomplish color reproduction, position indicating means systematically disposed with respect to said color-producing elements, means to recreate said subcarrier, and scanning control means electrically connected to said position indicating means and to said means-to-recreate said subcarrier to determine that each left and right eye image shall be reproduced according to corresponding values of the field of view.

2. A color stereoscopic television system comprising means for forming a plurality of intercalated right and left eye images of a field of view upon an image-receiving surface having plural color filters and sensitive material in successive light-permeable layers, means to produce color video signals corresponding to said images, subcarrier modulated television means for transmitting said video signals to reproducing means, said subcarrier means including an oscillator and two modulators, said modulators connected to said means-to-produce-color-video-signals, means to maintain the production of said video signals in synchronism with the alternations of said subcarrier; means for reproducing said plurality of right and left eye images of said field of view, means adjacent thereto to restrict the view of the right eye of a viewer to see only the right eye image and the left eye only the left eye image, said means for reproducing having different color-producing elements in each said image, each said different element having a unique secondary emission ratio, means to sense the secondary emission ratio at each instant of time in the operation of said means for reproducing, means connected to and controlled by said means to sense the secondary emission ratio to ascertain which color video signal shall control the means for reproducing at each instant of time, position indicating means systematically disposed with respect to said color-producing elements, means to recreate said subcarrier, and scanning control means electrically connected to said position indicating means and to said means-to-recreate said subcarrier to determine that the color reproduction of each right and left eye image reproduced shall be proportional to the corresponding values of the field of view upon said image-receiving surface.

3. A color stereoscopic television system comprising means for forming interpolated left and right eye images of a field of view upon an image-receiving surface having different color filters and sensitive material in alternate layers, means to produce color video signals corresponding to said images, subcarrier modulated simultaneous color television means having a balanced modulator connected to said means-to-produce-color-video-signals to impress said video signals upon said subcarrier for conveying said video signals to reproducing means, means to maintain the production of said video signals in constant synchronism with the alternations of said subcarrier; means for reproducing right and left eye images of said field of view, means aligned therewith to restrict the view of the left eye of a viewer to see only the left eye image and the right eye only the right eye image, said means for reproducing having different color-producing elements in each said image, each said different element having a different ratio of secondary emission, means to sense the secondary emission ratio at each instant of time in the operation of said means for reproducing, means connected to said means to sense the secondary emission ratio to ascertain which color video signal shall control the means for reproducing to accomplish correct color reproduction, a source to reproduce the alternations of said subcarrier, and means connected to said means to reproduce and also to said source of alternations of said subcarrier to determine that the color and intensity of reproduction of each left and right eye image reproduced shall be proportional to the corresponding values of the field of view upon said image-receiving surface.

4. A color stereoscopic television system comprising means for forming plural right and left eye images of a field of view upon layered color sensitive light-permeable photoelectric image-receiving surfaces, conductive means upon said photoelectric surfaces, a subcarrier television modulator for forming color video signals connected to said photoelectric surfaces, a subcarrier oscillator modulatably connected to said modulator, means indexed by said conductive means to scan said photoelectric surfaces in synchronism with the subcarrier of said television means; color television reproducing means having plural kinds of light-emissive stripes, means aligned with said stripes to restrict the view of the right eye of a viewer to see only the right eye image and the left eye only the left eye image, each kind of said stripes having a secondary emission unique thereto, means connected to said reproducing means to sense the secondary emission ratio for each instant of operation thereof, means connected to the connected means and to said reproducing means to control the latter according to the proper color video signal at each instant, signal-producing means recurrently associated with said stripes, a source reproducing said subcarrier, means connected to said signal-producing means and to said source reproducing said subcarrier to control said reproducing means to align the color reproduction of said right and left eye images with said means aligned with said stripes for the stereoscopic reproduction of a color image.

5. A successive light-permeable color stereoscopic television system comprising means for forming interleaved left and right eye images of a field of view upon color sensitive photoelectric image-receiving surfaces disposed in layers, conductive means aligned with said interleaved images upon said photoelectric surfaces, subcarrier-modulated means composed of an oscillator and a modulator for forming color video signals from the outputs of said photoelectric surfaces, said modulator connected to accept said outputs, electron means indexed by said conductive means to scan said photoelectric surfaces in synchronism with the alternations of the subcarrier means; reproducing means having colored-light-emissive stripes, means aligned with said stripes to restrict the view of the left eye of a viewer to see only the left eye image and the right eye only the right eye image, each of said stripes having a secondary emission ratio unique to the color of the light emitted thereby, means twice-connected to said reproducing means to sense the secondary electron emission ratio for each instant of operation thereof, gating means connected to said twice-connected means and to said reproducing means to modulate the intensity of reproduction of the latter according to the proper color video signal at each instant, indexing means recurrently associated with said stripes, a source reproducing said subcarrier comparator means connected to said indexing means and to said source reproducing the alternations of said subcarrier to control the scanning of said reproducing means to align the color reproduction of said left and right eye images with said means aligned with said stripes for the stereoscopic reproduction of a color image.

6. A color stereoscopic television system comprising optical means for forming interleaved right and left eye images of a field of view upon one image-receiving surface, primary color-sensitive light transmissable photoelectric surfaces layered one upon another comprising said image-receiving surface, conductive means aligned with said interleaved images upon one said photoelectric surface, subcarrier-modulated simultaneous color television means for forming color video signals from the electron output of said photoelectric surfaces, said subcarrier-modulated means having a modulator connected to said photoelectric surfaces, electron means indexed by said conductive means to scan said photoelectric surfaces in exact synchronism with the alternations of the subcarrier of said color television means; cathode-ray reproducing means having primary color light-emissive stripes, second optical means aligned with said stripes to restrict the view of the right eye of a viewer to see only the right eye image and the left eye only the left eye image, each of said stripes having a secondary emission ratio distinctive to the primary color of the light emitted thereby, means twice-connected to said cathode-ray reproducing means to sense the secondary emission ratio for each instant of time of operation thereof, gating means connected to said twice-connected means and to said cathode-ray reproducing means to modulate the intensity of reproduction of the latter according to the proper color video signal at each instant of time, indexing means recurrently associated with said stripes, a source reproducing the alternations of said subcarrier comparator means connected to said indexing means and to said source reproducing the alternations of said subcarrier to control the scanning of said cathode-ray reproducing means to align the color reproduction of said right and left eye images with said second optical means for the stereoscopic reproduction of a color image.

7. A stereoscopic color television system comprising means for forming partial left and right stereoscopic images, plural transparent light to electrical transducing surfaces, different color filters interleaved between the whole area of said surfaces, said images incident upon said surfaces, television means to form color video signals from the electrical responses of said surfaces to said images, a source of subcarrier oscillation, modulator circuit means connected to said means to form said signals and to said source of subcarrier to form said signals in step with said subcarrier and thereby geometrically related to said stereoscopic images; electrical means to reproduce said images having areas of different colored light emitting substances upon a viewing screen, elements disposed in front of said areas to separate left and right eye color images at the eyes of a viewer, each of said areas having an electron emission capability unique to the color of light emitted thereby, sequential means connected to said electrical means to control the emission of light by each different colored light emitting substance in accordance with the light incident upon said transducing surfaces of the same color response, said sequential means actuated by energy from said unique electron emission capability, a source reproducing the alternations of said subcarrier, positional means recurrently disposed with respect to said areas, second circuit means connected to said positional means and to said source reproducing the alternations of said subcarrier to position each said reproduced left and right eye image in relation to said optical elements to accomplish said separation of one from the other at the eyes of the viewer.

8. A stereoscopic color television system comprising means for forming adjacent partial right and left stereoscopic light images, plural spaced light-permeable light to electrical transducing surfaces, fewer different color filters interleaved between the whole area of said surfaces, said surfaces positioned to receive said images and having geometrical indexing means, subcarrier means having an oscillator and two balanced modulators connected thereto and to said transducing surfaces, to form color video signals from the electrical responses of said surfaces to said images, adjusting means connected to said subcarrier means to form said video signals in synchronism with the alternations of said subcarrier and thereby geometrically related to said stereoscopic images; luminescent means to reproduce said images having multiple areas of different colored light-emitting substances upon a viewing screen, another multiple of optical elements disposed in front of and aligned with said areas to separate right and left eye color images at the eyes of a viewer, each of said areas having an electron secondary emission ratio distinctive to the color of light emitted thereby, selective means connected to said luminescent means to successively control the emission of light by each different colored light-emitting substance in accordance with light incident upon said transducing surface of the same color response, said selective means actuated by electrical energy arising from said distinctive secondary emission ratios, positional indicating means recurrently disposed with respect to said multiple areas, a source reproducing the alternations of said subcarrier, second adjusting means connected to said indicating means and to said source reproducing the alternations of said subcarrier to position each of said reproduced right and left eye color images in relation to said optical elements to accomplish said separation of one from the other at the eyes of the viewer.

9. A stereoscopic color television system comprising means for forming alternate adjacent partial left and right stereo light images, plural relatively transparent closely spaced light to electrical transducing surfaces, the same plurality-less-one different color filters each interleaved between the whole area of said surfaces and occupying said spaces, said surfaces positioned to receive said images and having geometrical indexing means, subcarrier color television means to form color video signals from the electrical responses of said surfaces to said images, said subcarrier means having plural modulators connected to said surfaces, phase adjusting means connected to the indexing means and to said television means to maintain the formation of said signals in phase with the alternations of said subcarrier and thereby geometrically related to said stereo images; electroluminescent means to reproduce said images having multiple elongated areas of different colored light emitting substances upon a viewing screen, a lesser multiple of optical elements disposed in front of and aligned with said elongated areas to separate left and right eye color images at the eyes of an observer, each of said areas having a secondary emission ratio unique to the color of light emitted thereby, sequentially selective means connected to gate said electroluminescent means to successively control the emission of light by each different colored light emitting substance in accordance with the light incident upon said transducing surface originating said video signals of the same color, said selective means actuated by electrical energy arising from said unique secondary emission ratios, positional electrical indicating means recurrently disposed with respect to said elongated areas, a source reproducing the alternations of said subcarrier, second phase adjusting means connected to said indicating means and to said sources reproducing the alternations of said subcarrier to position each said reproduced left and right eye color image in relation to said lesser number of optical elements to accomplish said separation of one from the other at the eyes of an observer.

10. In a color stereoscopic television system having electrical scanning means, a lenticulated screen, plural kinds of light emissive stripes aligned with said screen and means sychronized with a subcarrier to display intercalated left and right eye images in registry with said lenticulated screen; color stereoscopic camera means comprising means for forming superimposed left and right eye images of a field of view, plural layered photoelectric transparent surfaces, a color filter between each of said surfaces, said surfaces positioned to receive said left and right eye images, a grating interposed between said means for forming and said surfaces to interpolate plural left and right eye images upon said surfaces, a grid aligned with said grating adjacent said surfaces, means to produce an electron beam, means to cause said electron beam to accomplish scanning over said surfaces, subcarrier means having an oscillator and a modulator, means having a connection with said subcarrier means, said grid and with said means to accomplish scanning to produce a signal arising from said electron beam scanning said grid to regulate said speed of said scanning to produce video signals of said left and right eye images in synchronism with alternating energy of said subcarrier means, means connected to two surfaces nearest said grating to form a video signal corresponding to one color, second means connected to two surfaces farther from said grating to form a video signal proportional to a second color, and a said surface fartherest from said grating forming a video signal proportional to a third color, said means and said second means connected to said surfaces also connected to the modulator of said subcarrier means to video modulate said subcarrier.

11. In a color stereoscopic television system having electronic scanning means, a lenticulated screen, plural kinds of light-emissive strips aligned with said screen and means actuated by a subcarrier to display intercalated left and right eye color images in aligned registry with said lenticulated screen; color stereoscopic camera means comprising optical means for forming superimposed left and right eye images of a field of view, three transparent photoelectric surfaces, two color filters of equivalent areas interleaved between said surfaces, said surfaces positioned to receive said left and right eye images, a vertical grating interposed between said optical means and said surfaces to intercalate plural left and right eye images upon said surfaces, a grid upon said surfaces aligned with said grating, means to produce electron beam television scanning over said surfaces with the most rapid scan perpendicular to the alignment of said grid, subcarrier means, comparison means connected to said subcarrier means and to said means to produce scanning to effect the most rapid scan to produce a control signal arising from said electron beam scanning said grid to regulate said speed of said most rapid scan to produce video signals of said left and right eye images in synchronism with the energy waveform of said subcarrier means, electrical means connected to the two said surfaces nearest said grating to form a video signal corresponding to one primary color, second electrical means connected to the two said surfaces fartherest from said grating to form a video signal proportional to a second primary color, said surface farthest from said grating adapted to form a video signal proportional to a third primary color, and two balanced modulators connected to said electrical means, to said farthest surface and to said subcarrier means, to form a subcarrier-modulated simultaneous color television video signal.

12. In a color stereoscopic television system having cathode-ray scanning means, a lenticulated reproducing screen, plural kinds of light emissive stripes aligned with said screen and synchronizing means actuated by a subcarrier to display intercalated right and left eye color images in registry with the lenticules of said lenticulated screen; color stereoscopic camera means comprising plural optical means for forming superimposed right and left eye images of a field of view, three thin transparent photoelectric surfaces, two thin color filters each having an area approximately equal to the area of one of said photoelectric surfaces interleaved between said surfaces, said surfaces positioned to receive the whole areas of both said right and left eye images, a vertical grating interposed between said plural optical means and said surfaces near said surfaces to intercalate plural exclusively right and left eye images upon said surfaces, a conductive grid upon said surfaces aligned with said grating, means to produce an electron beam, means to cause said electron beam to accomplish television scanning over said surfaces with the most rapid scan perpendicular to the alignment of said grid, a subcarrier oscillator, comparison means connected to said oscillator, to said conductive grid, and to that portion of the means to cause said electron beam to accomplish television scanning with the most rapid scan, to produce a control signal arising from said electron beam scanning said grid to relatively constantly regulate said speed of said most rapid scan to produce video signals of said right and left eye images in synchronism with the alternations of said subcarrier oscillator, electrical combining means connected to the two said surfaces nearest said grating to form a video signal corresponding to one primary color, second electrical combining means connected to the two said surfaces farthest from said grating to form a video signal proportional to a second primary color, said surface farthest from said grating adapted to form a video signal proportional to a third primary color, a color matrix unit connected to said two electrical combining means and to said farthest surface, and two balanced modulators connected to said matrix unit and to said subcarrier oscillator to form a subcarrier modulated simultaneous type color television video signal.

13. In a color stereoscopic television system having means for forming plural interleaved right and left eye images of a view upon color transducing surfaces, subcarrier means for forming color television signals modulatably connected to said transducing surfaces and means aligned with said plural images connected to said means for forming signals to synchronize the formation of said color television signals with said subcarrier; reproducing means comprising a lenticulated face, a large plurality of light-emissive stripes aligned behind the lenticules of said face, there being a few kinds of said stripes each adapted to emit different colored light, each kind having a unique ratio of secondary electron emission, plural conductors aligned with said phosphor stripes, means synchronized to said subcarrier and connected to said plural conductors to actuate said reproducing means in synchronism with said means for forming color television signals, means to sense the ratio of electrons impinging upon said phosphor stripes with the electrons emitted therefrom by secondary emission, circuit means connected to said means to sense to pass a television signal of one color for actuating said reproducing means corresponding to the color of the phosphor stripe impinged upon at that instant, said lenticules and said phosphor stripes disposed within said reproducing means to present to the right eye of a viewer only a color image corresponding to the right eye image formed by said means for forming and to the left eye of said viewer only a color image corresponding to the left eye image formed by said means for forming.

14. In a color stereoscopic television system having means for forming contiguous intercalated left and right eye images of a field of view upon color transducing surfaces, subcarrier television means modulatably connected to said transducing surfaces for forming color television signals and grid-like means aligned with said contiguous images connected to said television means to synchronize the formation of said color television signals with said subcarrier; cathode-ray reproducing means comprising a lenticulated viewing face, a large plurality of phosphor-like strips aligned behind the lenticules of said face, there being a small plurality of kinds of said phosphors each adapted to emit different colored light, each kind having a distinctive ratio of secondary electron emission, further grid-like means aligned with said phosphor strips regularly disposed in relation thereto, comparator means synchronized to said subcarrier and connected to said further grid-like means to accurately synchronize said cathode-ray reproducing means with said means for forming color television signals, electrode-like means within said cathode-ray reproducing means to collect the secondary emission from said phosphor strips arising from the impact of primary image-reproducing electrons thereupon, color discriminator means connected to said electrode-like means and to means to produce said primary electrons to determine the ratio of electrons impinging upon said phosphor strips to the electrons emitted therefrom by secondary emission, a gating circuit connected to said discriminator means to pass a television signal of one color corresponding to the color of the phosphor strip impinged upon by said primary electrons at that instant, said lenticules and said phosphor strips aligned in said reproducing means so that the left eye of a viewer sees only a color image corresponding to the left eye image formed by said means for forming and the right eye of said viewer sees only a color image corresponding to the right eye image formed by said means for forming.

15. In a color stereoscopic television system having optical means for forming interspersed left and right eye images of a field of view upon color light to electricity transducing surfaces, subcarrier-modulated simultaneous color television means for forming color television signals connected to said surfaces and conductive means aligned with said interspersed images connected to said television means to synchronize the formation of said color television signals with said subcarrier; reproducing means comprising a cathode-ray tube, said tube having a vertically lenticulated viewing face, a large plurality of phosphor stripes aligned behind the lenticules of said face, there being a small plurality of kinds of said phosphors repetitively disposed in rotation and each adapted to emit different colored light with each kind phosphor having a unique ratio of secondary emission, an indexing grid aligned with said phosphor stripes having conductors regularly disposed in relation thereto, horizontal deflection means, comparator means including a subcarrier oscillator synchronized to said subcarrier connected to said horizontal deflection means and to said indexing grid to horizontally deflect the electron stream of said cathode-ray tube relatively constantly in synchronism with said means for forming color television signals, an electrode within said cathode-ray tube to collect the secondary emission from said phosphor stripes arising from the impact of said electron stream thereupon, a color discriminator circuit connected to said electrode and to means to form said electron stream to compare the ratio of electrons impinging upon said phosphor stripes with the electrons emitted therefrom by secondary emission, a triple gating circuit connected to said discriminator circuit to pass a television signal of one color corresponding to the color of the phosphor stripe impinged upon by said electron stream at that instant, said lenticules and said phosphor stripes aligned and within said reproducing means so that the left eye of a viewer sees only a color image corresponding to the left eye image formed by said optical means and the right eye of said viewer sees only a color image corresponding to the right eye image formed by said optical means.

References Cited in the file of this patent

UNITED STATES PATENTS

| | | |
|---|---|---|
| 2,472,259 | McPherson | June 7, 1949 |
| 2,621,247 | Wright | Dec. 9, 1952 |
| 2,689,269 | Bradley | Sept. 14, 1954 |
| 2,734,938 | Goodale | Feb. 14, 1956 |
| 2,744,952 | Lawrence | May 8, 1956 |
| 2,752,418 | Clapp | June 26, 1956 |